US011256874B2

(12) United States Patent
Sathaye et al.

(10) Patent No.: US 11,256,874 B2
(45) Date of Patent: Feb. 22, 2022

(54) SENTIMENT PROGRESSION ANALYSIS

(71) Applicant: Optum Technology, Inc., Eden Prairie, MN (US)

(72) Inventors: Ninad D. Sathaye, Bangalore (IN); Raghav Bali, Bangalore (IN); Piyush Gupta, Bangalore (IN); Krishnamohan Nandiraju, Hyderabad (IN)

(73) Assignee: Optum Technology, Inc., Eden Prairie, MN (US)

( * ) Notice: Subject to any disclaimer, the term of this patent is extended or adjusted under 35 U.S.C. 154(b) by 61 days.

(21) Appl. No.: 16/902,936

(22) Filed: Jun. 16, 2020

(65) Prior Publication Data

US 2021/0390264 A1 Dec. 16, 2021

(51) Int. Cl.
*G06F 15/00* (2006.01)
*G06F 40/35* (2020.01)
*H04M 3/51* (2006.01)
*G06Q 30/02* (2012.01)

(52) U.S. Cl.
CPC ......... *G06F 40/35* (2020.01); *H04M 3/5141* (2013.01); *H04M 3/5191* (2013.01); *G06Q 30/0241* (2013.01)

(58) Field of Classification Search
CPC ... G06F 40/35; H04M 3/5141; H04M 3/5191; G06Q 30/0241
USPC .......................................................... 704/9
See application file for complete search history.

(56) References Cited

U.S. PATENT DOCUMENTS

| 8,412,530 | B2 * | 4/2013 | Pereg ...................... G06F 40/35 704/270 |
| 10,044,865 | B2 * | 8/2018 | Dumaine ................ H04N 7/147 |
| 10,212,119 | B2 * | 2/2019 | Bisarya ................... H04L 51/24 |
| 10,462,300 | B2 * | 10/2019 | Dumaine ................. G06K 9/00 |
| 10,541,952 | B2 * | 1/2020 | Chiu ........................ G06F 40/20 |
| 10,546,235 | B2 * | 1/2020 | Moudy ............ G06F 16/24578 |
| 11,140,266 | B2 * | 10/2021 | Khafizov ............... G06N 20/10 |

(Continued)

OTHER PUBLICATIONS

Asghar, Muhammad Zubair et al. "A Review of Feature Extraction In Sentiment Analysis," Journal of Basic and Applied Scientific Research, Feb. 18, 2014, vol. 4, No. 3, pp. 181-186.

(Continued)

*Primary Examiner* — Khai N. Nguyen
(74) *Attorney, Agent, or Firm* — Alston & Bird LLP

(57) ABSTRACT

Various embodiments of the present disclosure performing conversation sentiment monitoring for a conversation data object. In various embodiments, a text block that can be resized is identified within a conversation data object and successive regularized sentiment profile generation iterations are performed until a regularized sentiment score of the block exceeds a regularized sentiment score threshold. A current regularized sentiment profile generation iteration involves determining a regularized sentiment score for the block based on an initial sentiment score, a subjectivity probability value, and, optionally, a stage-wise penalty factor. A determination is then made as to whether the score exceeds the threshold. If so, then a regularized sentiment profile of the conversation data object is updated based on the regularized sentiment score. If not, then the text block is resized and a subsequent regularized sentiment profile generation iteration is performed based on the resized block.

20 Claims, 9 Drawing Sheets

(56) References Cited

U.S. PATENT DOCUMENTS

| | | | | |
|---|---|---|---|---|
| 2006/0069589 | A1* | 3/2006 | Nigam | G06F 40/253 |
| | | | | 706/55 |
| 2014/0067375 | A1* | 3/2014 | Wooters | G06F 40/40 |
| | | | | 704/9 |
| 2016/0300135 | A1* | 10/2016 | Moudy | G06F 40/30 |
| 2017/0353605 | A1* | 12/2017 | Dumaine | G06Q 10/063112 |
| 2018/0270356 | A1* | 9/2018 | Dumaine | G06K 9/00315 |
| 2018/0316635 | A1* | 11/2018 | Chiu | H04L 67/306 |
| 2020/0125805 | A1* | 4/2020 | Wooters | G06F 40/35 |
| 2020/0334306 | A1* | 10/2020 | Baughman | G06F 3/167 |
| 2020/0395008 | A1* | 12/2020 | Cohen | G06F 40/205 |
| 2021/0012864 | A1* | 1/2021 | Cintas | G06K 9/00221 |
| 2021/0044697 | A1* | 2/2021 | Khafizov | G06F 40/20 |
| 2021/0201267 | A1* | 7/2021 | Peer | G06N 5/02 |

OTHER PUBLICATIONS

Kim, Soo-Min et al. "Determining The Sentiment Of Opinions," In COLING 2004: Proceedings of the 20th International Conference on Computational Linguistics, (2004), pp. 1367-1373.
Liu, Bing. "Sentiment Analysis and Opinion Mining," Synthesis Lectures On Human Language Technologies, May 2012, (168 pages), Morgan & Claypool Publishers.
Polanyi Livia et al. "Contextual Valence Shifters," In Computing Attitude and Affect In Text: Theory and Applications, (2006), pp. 1-6. Springer, Dordrecht.

* cited by examiner

1. Agent: Good Morning, thank you for calling.... Company.
2. Caller: I have had multiple conversations with your support.
3. Agent: Oh okay, may I know your claim id?
4. Caller: It has been a complete waste of time.
5. <Silence and background noise>
6. Caller: No one has been able to address my problem.

801 Elastic-Block-1: I have had multiple conversations with your support.
Subjectivity ~ 0 - threshold not met, continue resizing block
New Sentiment (pos, neu, neg): (0.866, 0.132, 0)

802 Elastic-Block-2: I have had multiple conversations with your support. It has been a complete waste of time.
subjectivity=0.133 - threshold not met, continue resizing block
New Sentiment (pos, neu, neg): (0.423, 0.021, 0.556)

803 Elastic-Block-3: I have had multiple conversations with your support. It has been a complete waste of time. No one has been able to address my problem.
subjectivity=0.33 - threshold MET, stop processing block
New Sentiment (pos, neu, neg): (0.386, 0.018, 0.596)

FIG. 8

SENTIMENT PROGRESSION ANALYSIS

TECHNOLOGICAL FIELD

The example embodiments of the present disclosure are related to monitoring the sentiment progression of a conversation.

BACKGROUND

Many settings involve evaluating the quality of conversations. For instance, many contact centers conduct reviews of calls involving their agents and remote parties to evaluate the quality of service provided on the calls by their agents. Depending on the circumstances, these evaluations may be conducted in real time as conversations are taking place or at a later time after the conversations have been completed. For instance, evaluating calls in real time allows for contact centers to take actions immediately when a problem is detected such as, for example, having a supervisor bridged onto a call (intervene) when a caller is perceived to be upset (due to escalation). While evaluating calls after the calls have taken place allows for contact centers to identify issues particular agents are having fielding calls and/or to use as training tools for agents to help improve caller experience.

One of the more important aspects in evaluating the quality of a conversation is determining the sentiment displayed by a party during the conversation. For instance, the sentiment can help to identify where something went wrong during the conversation, whether a party was upset prior to taking part in the conversation, or whether another party involved in the conversation said or did something during the conversation to upset the party.

Accordingly, one way of looking at the quality of a conversation is analyzing the sentiment progression of the whole conversation. For instance, it can be helpful in identifying at what point during a conversation did the tone of the conversation degrade. The general implementation for analyzing sentiment in a conversation typically includes converting the conversation into a text format (generating a transcript), if the conversation is audio, and running a sentiment analysis on the generated transcript.

For instance, for a call, a text converter may be used that recognizes the speakers in the call and annotates the transcript with a speaker tag and a timestamp. In turn, a segmentation service may be used to separate out the transcript based on the different party's utterances. At that point, a sentiment analysis engine may be used to generate a sentiment score for each utterance, as well as in some instances an overall sentiment score. In addition, a post-processing step may be performed to visualize sentiment progression through the call, sentiment degradation trends, etc.

However, this conventional approach has drawbacks. For instance, various commercially-available and opensource sentiment analysis engines provide large variations in sentiment score. Not only do these various sentiment analysis engines contradict each other on the sentiment scores reported by the engines, but these engines will many times significantly deviate from the manually interpreted sentiment. Therefore, a need exists in the industry that overcomes these shortcomings and allows for a more reliable sentiment prediction that is closer to the what is directly observed by manual review.

BRIEF SUMMARY

In general, embodiments of the present invention provide methods, apparatus, systems, computing devices, computing entities, and/or the like for performing conversation sentiment monitoring for a conversation data object. In various embodiments, a text block that can be resized is identified within the conversation data object and one or more successive regularized sentiment profile generation iterations are performed until a regularized sentiment score of the text block exceeds a regularized sentiment score threshold. As described further herein, in particular embodiments, the regularized sentiment score provides a quantifiable measure of sentiment for the text block, where the score is determined in a subjectivity-aware and/or a stage-aware manner. In addition, the conversation data object may include one or more sequential text units and the text block is associated with a current subset of one or more of these units.

Accordingly, a current regularized sentiment profile generation iteration involves determining a regularized sentiment score for the text block based on an initial sentiment score and at least one of a subjectivity probability value and a stage-wise penalty factor. A determination is then made as to whether the regularized sentiment score exceeds the regularized sentiment score threshold. If so, then a regularized sentiment profile of the conversation data object is updated based on the regularized sentiment score.

However, if the score fails to exceed the threshold, then the text block is resized and a subsequent regularized sentiment profile generation iteration is performed based on the resized text block. For instance, the resizing of the text block may involve adding one or more subsequent text units to the current subset making up the text block. This process is repeated until all of the sequential text units for the conversation data object have been evaluated.

Accordingly, the initial sentiment score is generated in particular embodiments using an aggregation model and a plurality of per-model sentiment scores as input to the model that are determined using a plurality of sentiment prediction models. In addition, the stage-wise penalty factor is determined in particular embodiments by identifying a related conversation stage that is associated with the text block and using a segment-wise penalty determination model and at least one of the text blocks, the subjectivity probability value, and the related conversation stage.

In addition, in particular embodiments, one or more actions may be performed based on the regularized sentiment profile. For instance, the conversation data object may represent a call or a Web chat actively taking place and the actions performed may involve causing a party to be bridged onto the call or the Web chat as a result of the regularized sentiment profile indicating a party on the call or chat is experiencing negative sentiment. While in another instance, the one or more actions performed may involve causing a sentiment scoring graph to be displayed on a computer interface showing a per-time-unit sentiment score for each time unit of a plurality of time units associated with the conversation data object. Here, the sentiment scoring graph may also display a per-time-unit stage designation and for each time unit and/or a per-sentiment-score text designation for each per-time-unit sentiment score.

BRIEF DESCRIPTION OF THE DRAWINGS

Figure 1:
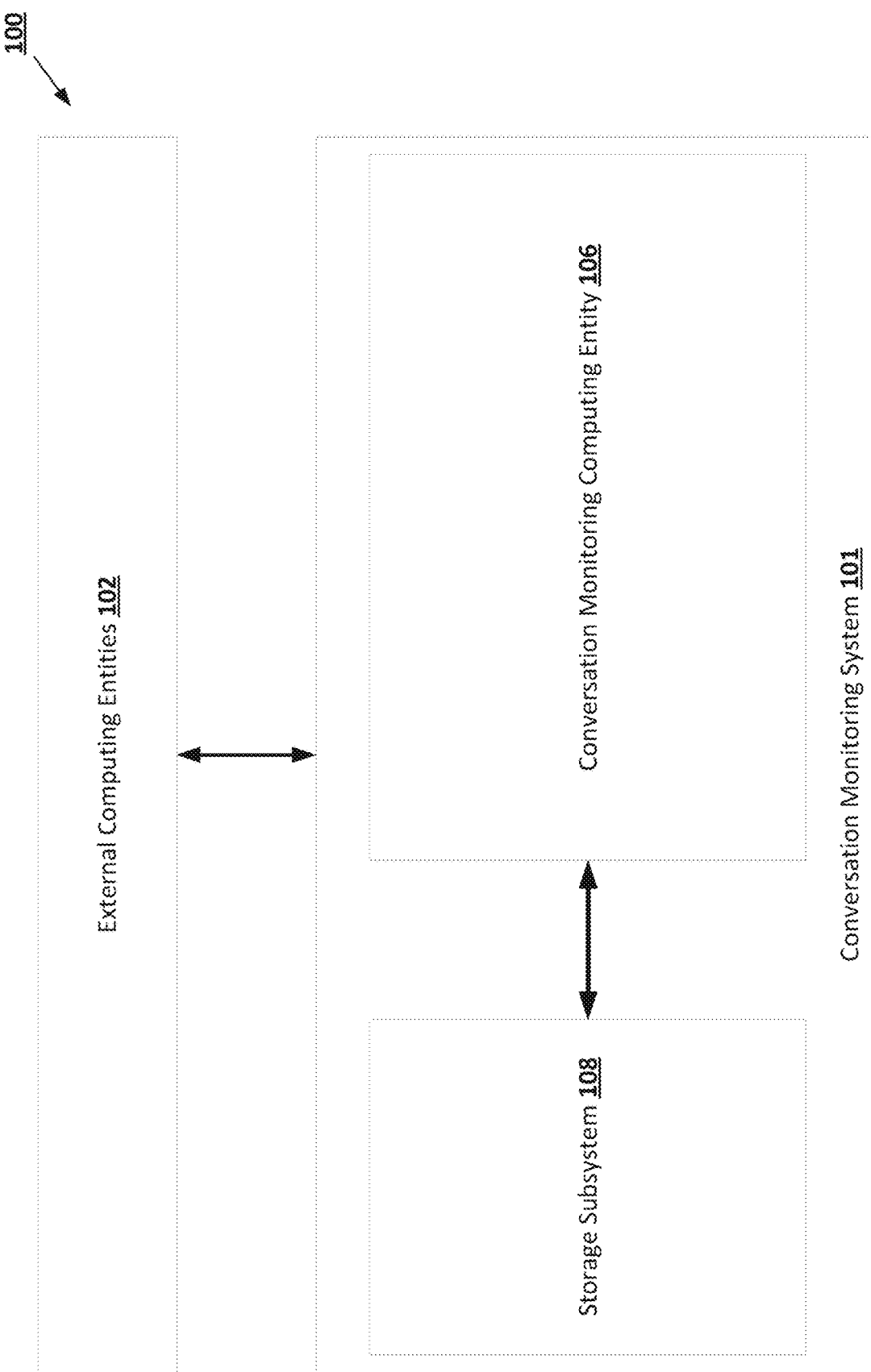

Having thus described the invention in general terms, reference will now be made to the accompanying drawings, which are not necessarily drawn to scale, and wherein:

FIG. 1 provides an exemplary overview of an architecture that can be used to practice various embodiments of the present invention.

Figure 2:
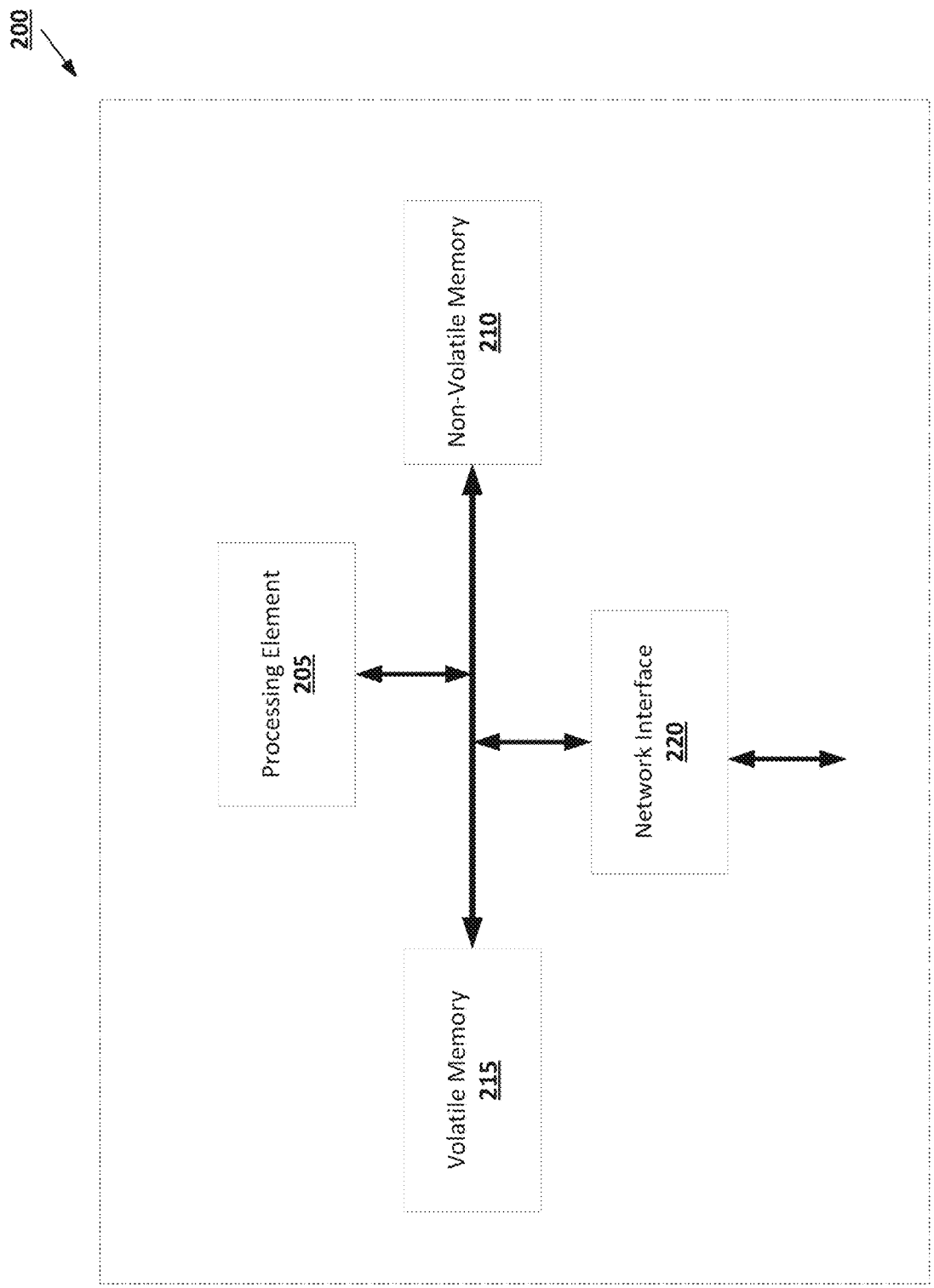

FIG. 2 provides an example computing entity in accordance with various embodiments discussed herein.

Figure 3:
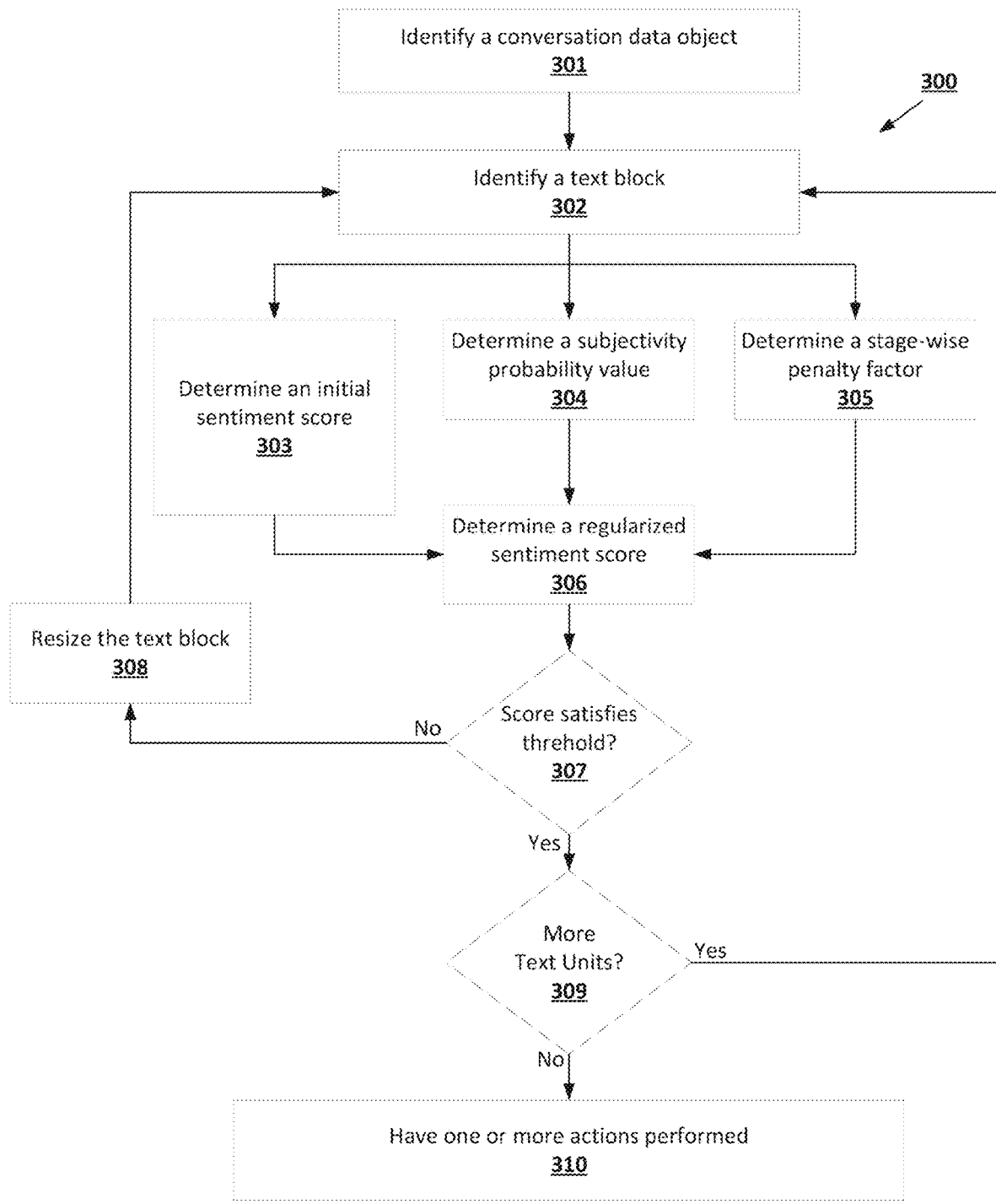

FIG. 3 provides a process flow for performing sentiment monitoring of a conversation in accordance with various embodiments discussed herein.

Figure 4:
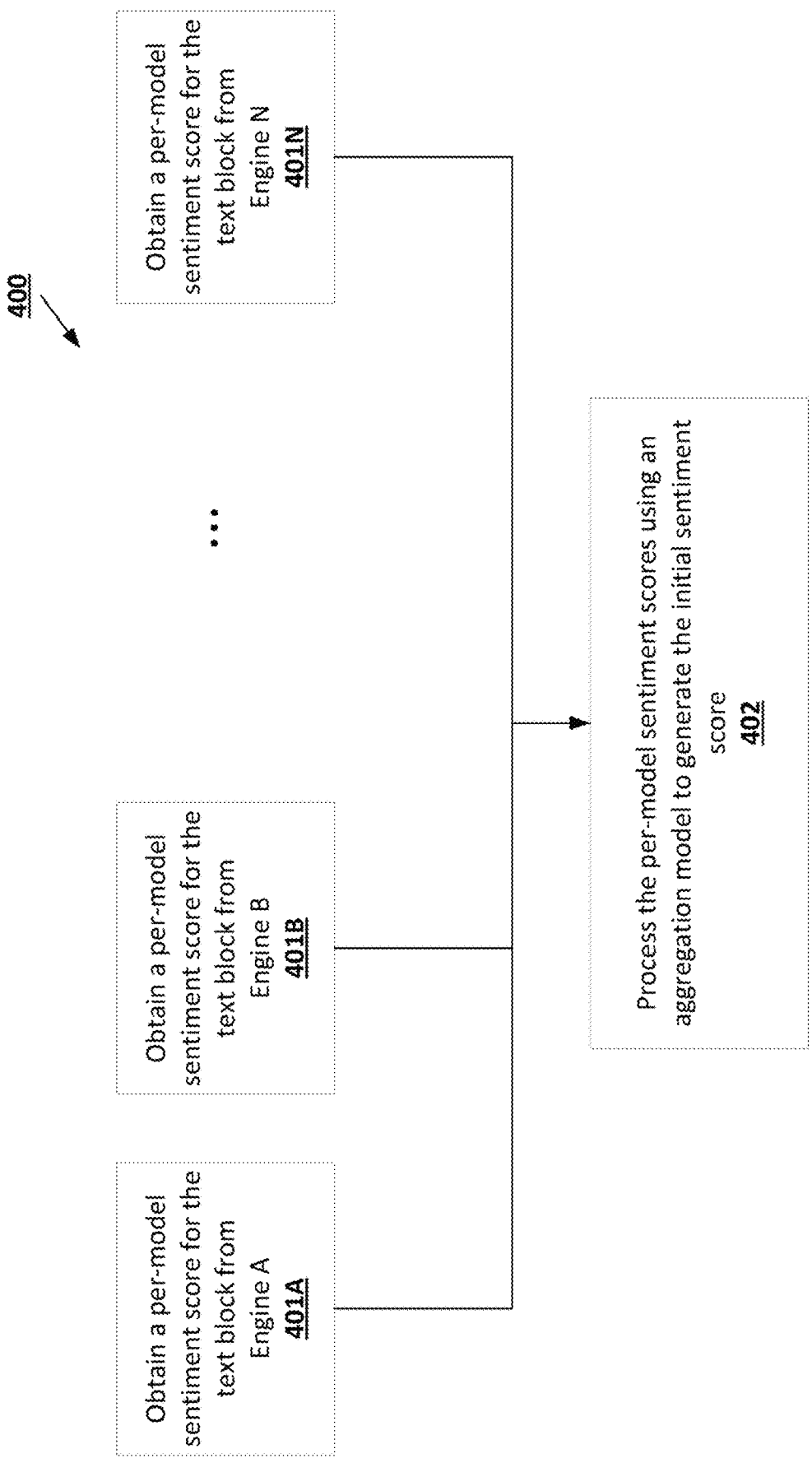

FIG. 4 provides a process flow for determining an initial sentiment score for a text block in accordance with various embodiments discussed herein.

Figure 5:
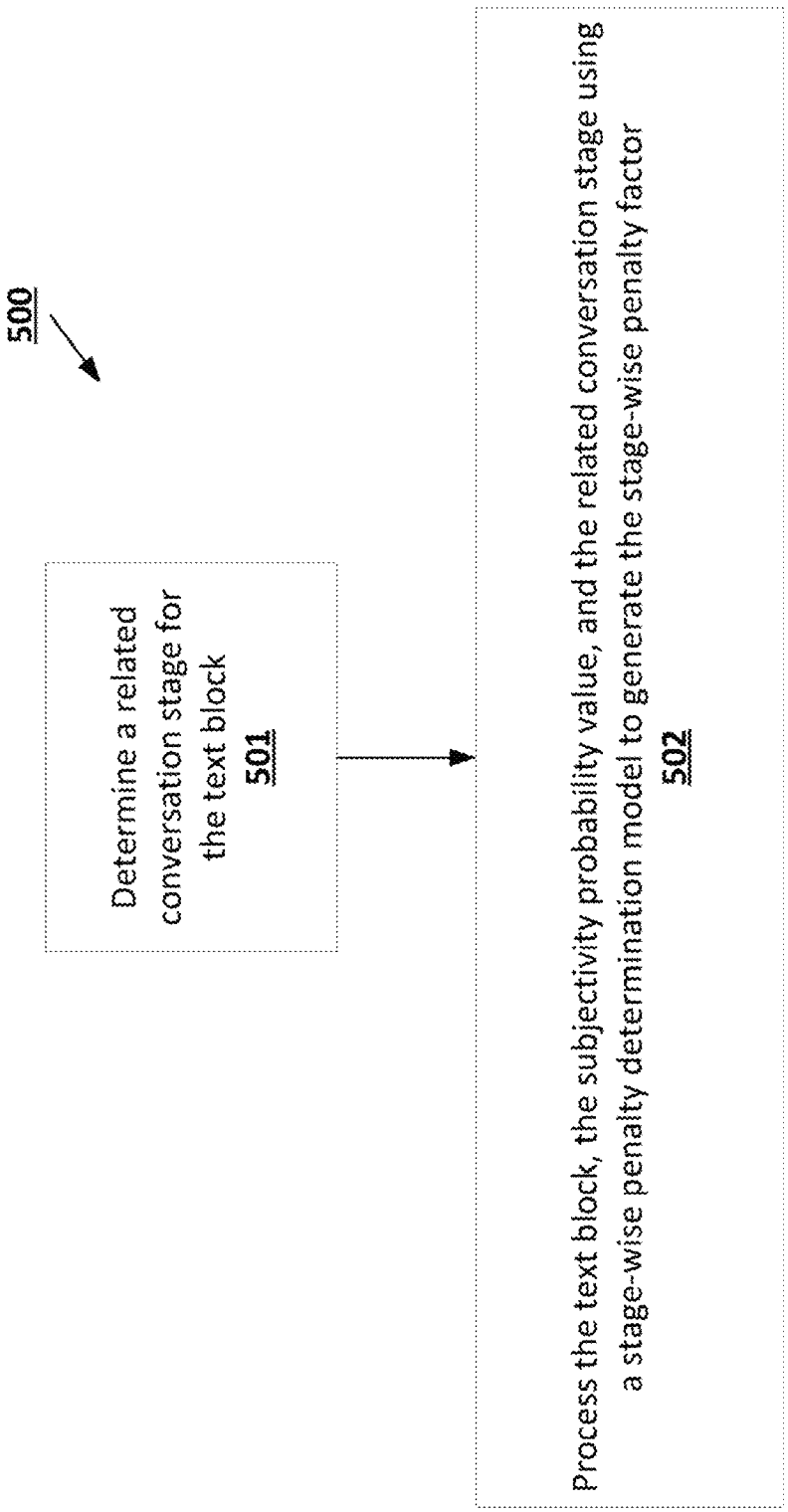

FIG. 5 provides a process flow for determining a stage-wise penalty factor in accordance with various embodiments discussed herein.

Figure 6:
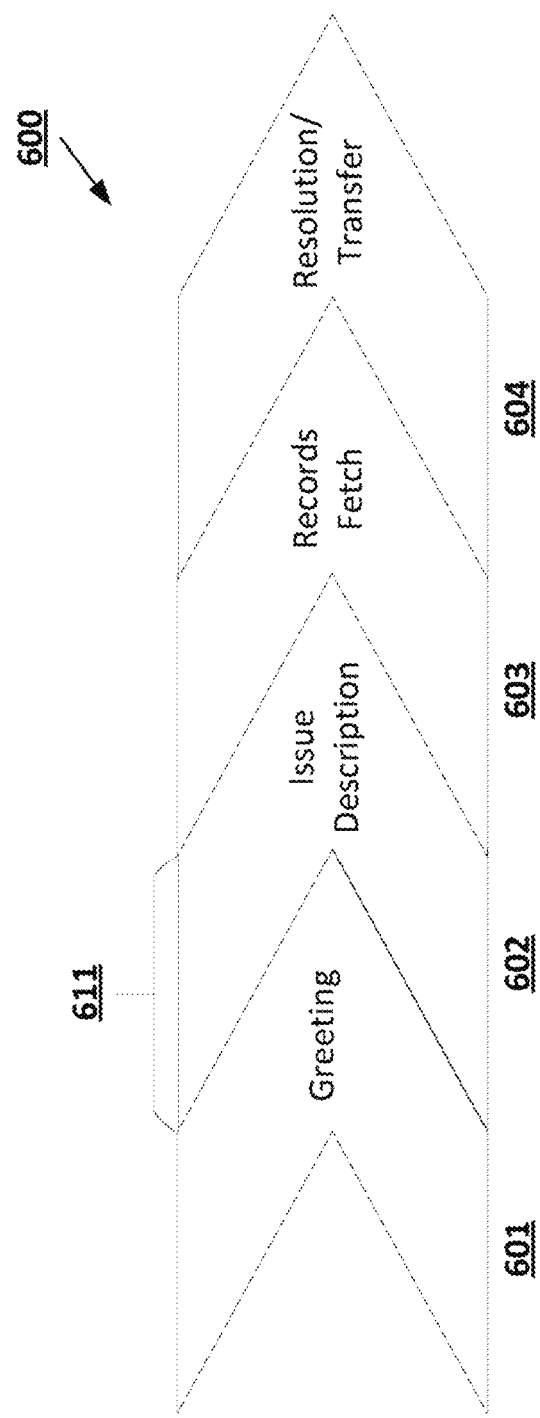

FIG. 6 provides an example of the different stages that may occur over the progression of a contact center health insurance call.

Figure 7:

FIG. 7 provides an example call conversation between an agent of a contact center and a caller.

FIG. 8 provides an example of resizing a text block in accordance with various embodiments discussed herein.

Figure 9:
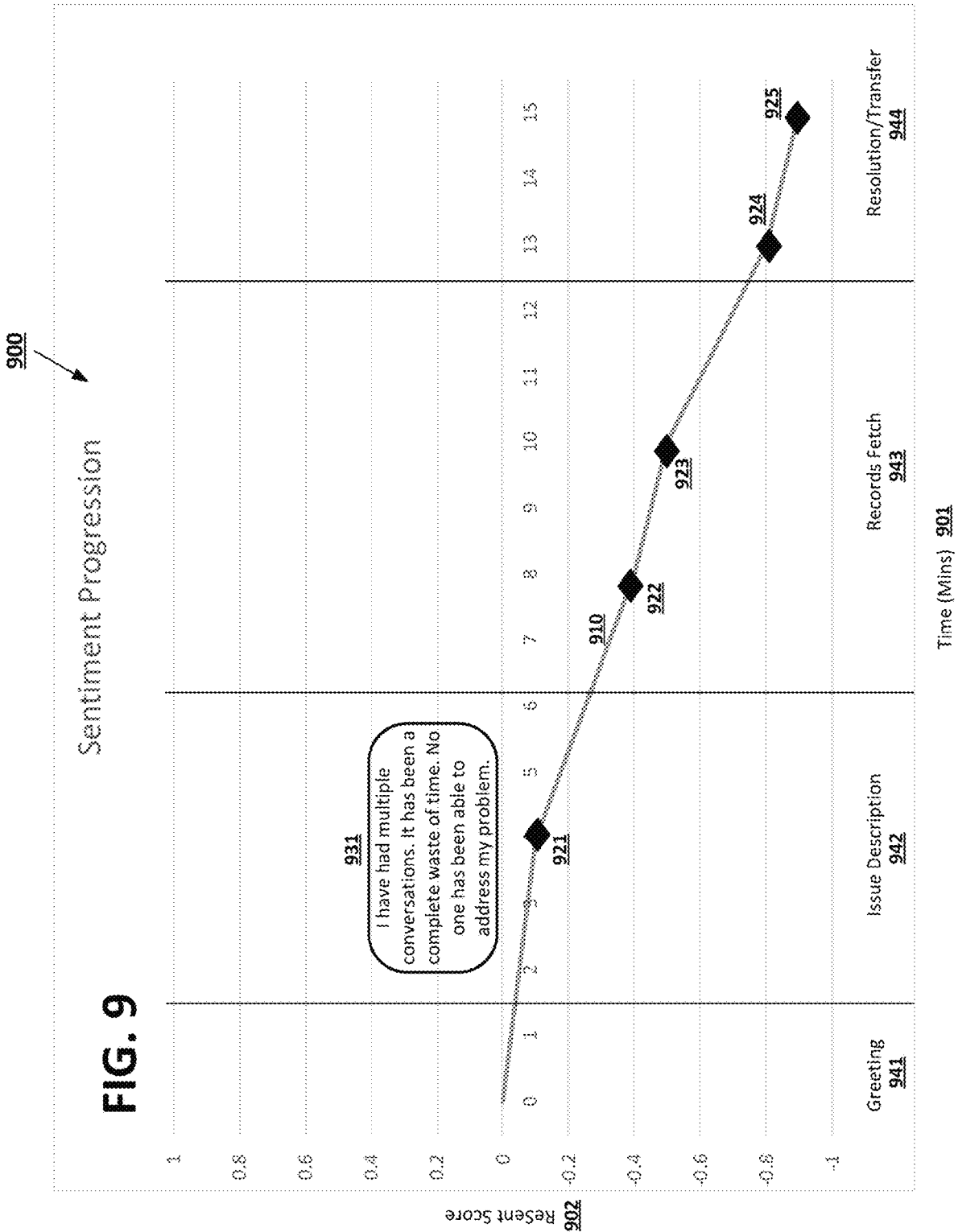

FIG. 9 provides a representation of a sentiment progression with respect to a party of a conversation throughout the conversation presented in a graphical format in accordance with various embodiments discussed herein.

DETAILED DESCRIPTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

General Overview

Discussed herein are methods, apparatus, systems, computing devices, computing entities, and/or the like related to sentiment monitoring processing of conversations such as those taking place within contact centers involving calls, text exchanges, and/or chats between remote parties (e.g., callers), agents, and automated entities (e.g., chatbots). Specifically, the context of a conversation expressed over conversation blocks (e.g., text blocks) is determined in various embodiments to understand sentiment progression over the course of the conversation. Here, in particular embodiments, sentiment consensus from multiple sentiment analysis engines is leveraged for the various conversation blocks and combined with factors such as subjectivity and stage of the conversation to improve the confidence of sentiment classification.

With that said, having a set block size that is too small or too large may lead to loss of context and meaningful sentiment and/or subjectivity. Therefore, A novel approach is introduced in various embodiments that involves inferring the sentiment at a dynamically resizable conversation block level. Here, the conversation block being analyzed may be resized in particular instances to add or remove conversation text to produce an acceptable confidence in the reported sentiment for the block. Accordingly, this conversation block may be referred to as an elastic text block or resizable text block. Finally, a novel approach is introduced in various embodiments involving quantifying/scoring the sentiment along with the aforementioned factors for a conversation block in the form of a regularized sentiment score (referred to as a ReSent score) that is easily interpretable.

Moreover, by performing sentiment modeling on a text input using resizable text blocks of the noted text, various embodiments of the present invention enable performing text processing on a more granular level while also enabling expansion of the granularity of the adopted text blocks if needed to ensure reliability of per-block sentiment scores. In doing so, various embodiments of the present invention reduce the need to retrieve large text segments from memory, which in turn improves computational efficiency and data retrieval efficiency of various sentiment modeling applications. Accordingly, various embodiments of the present invention make substantial technical improvements to various existing sentiment modeling applications and substantially improve efficiency of various existing techniques for performing sentiment modeling.

Definitions of Certain Terms

The term "conversation sentiment monitoring" may refer to a computer-implemented process that includes monitoring a conversation being conducted between two or more parties to analyze the sentiment progression of the conversation. The conversation may be audio-based such as a call or text-based such as a Web chat. In addition, the parties involved in a conversation may be human agents or automated agents such as chatbots.

The term "conversation data object" may refer to a data object that describes representation of a conversation being conducted between two or more parties. For example, a text transcript produced from the audio of a call conducted between parties. In various embodiments, the representation may be separated out based on party utterances found within the conversation. For example, for an audio conversation, an utterance may be identified as beginning when a party speaks and ending when audio silence is encountered or another party speaks.

The term "text block" may refer to a data object that describes a segment of a conversation data object. For instance, in particular embodiments, the conversation data object may include one or more sequential text units and the text block is associated with a current subset of one or more of these units. As discussed further herein, the text block is configured in various embodiments to be resizable. For instance, the text block may be resized to increase its size to include one or more additional text units of the conversation data object.

The term "pre-model sentiment score" may refer to a score produced by a sentiment analysis engine that represents the sentiment detected in a text block. In various embodiments, a sentiment analysis engine may be a predictive model.

The term "aggregation model" may refer to a data object that describes parameters and/or hyper-parameters of a model that processes pre-model sentiment scores produced by a plurality of sentiment analysis engines as input for a particular text box of a conversation data object to detect the sentiment in the text box. As discussed in further detail herein, in particular embodiments, the aggregation model may be an ensemble configured to process per-model sentiment scores generated by the plurality of sentiment analysis engines.

The term "initial sentiment score" may refer to a data object that describes a score derived for a text block of a conversation data object from using the aggregation model to product the score. Here, in particular embodiments, the initial sentiment score represents a consensus sentiment for the text block based on the individual scores produced by the plurality of sentiment analysis engines.

The term "subjectivity probability value" may refer to a data object that describes a likelihood that a corresponding text block describes subjective feelings, tastes, or opinions. Here, in particular embodiments, the subjectivity probability value is combined with a stage-wise penalty factor to generate a regularization factor for an initial sentiment score.

The term "conversation stage" may refer to a data object that describes a different phase of a conversation. A particular stage of a conversation may be characterized by a particular set of topics of focus associated with a time interval in the conversation. For example, a typical call center conversation (e.g., call between an agent and a remote party) may include the following stages: greeting in which greetings are exchanged; issue description in which the remote party identifies the reason for the call; records fetch in which the agent retrieves needed information; and resolution/transfer in which the agent addresses the party's reason for the call or transfers the call to someone else to handle. In particular instances, a stage may have sub-stages. For example, the resolution stage may have the sub-stage related to obtaining follow-up contact numbers and the sub-stage related to offering information.

The term "stage-wise penalty factor" may refer to a data object that describes a stage-aware sentiment score for a corresponding text block. A stage-wise penalty factor may be a variable used in determining the regularized sentiment score in various embodiments. The sentiment of a conversation typically varies during the course of the conversation and some stages tend to have greater relevance to sentiment generation than others. Therefore, an inference of sentiment can be made based on what stage of the conversation the text block corresponds to for the conversation. Thus, the stage-wise penalty factor may be used in various embodiments to compensate for high sentiment probability for a particular text block even when subjectivity is low for the block.

The term "stage-wise penalty factor determination model" may refer to a data object that describes parameters and/or hyper-parameters of a model used in various embodiments to determine the stage-wise penalty factor. For instance, in particular embodiments, the stage-wise penalty determination model generates the stage-wise penalty factor based on the text block being analyzed, the subjectivity probability value for the text box, and the conversation stage related to the text box.

The term "regularized sentiment score" may refer to a data object that describes a score describing a quantifiable measure of sentiment for a text block of a conversation data object, where the score is determined in a subjectivity-aware and/or a stage-aware manner. In various embodiments, the regularized sentiment score is determined from a consensus sentiment score in conjunction with a subjectivity measure, and optionally, a perceived stage of a conversation. Accordingly, the consensus sentiment may be represented in particular embodiments as an initial sentiment score. While the subjectivity measure may be represented in particular embodiments as a subjectivity probability value. Further, the perceived stage of a conversation may be used in particular embodiments as a stage-wise penalty factor in determining the regularized sentiment score. The regularized sentiment score in particular embodiments is referred to as a ReSent score.

The term "regularized sentiment profile" may refer to a data object that describes a representation of the sentiment progression with respect to one or more parties of a conversation throughout the conversation (e.g., the conversation data object). For instance, in particular embodiments, the regularized sentiment profile may reflect a regularized sentiment score for the party at different times throughout the conversation.

The term "regularized sentiment profile generation iterations" may refer to a data object that describes a repetitive process performed in various embodiments, where each iteration of the repetitive process may involve determining a regularized sentiment score for a particular text block of a conversation data object (e.g., based on an initial sentiment score, subjectivity probability value, and, optionally, a stage-wise penalty factor for the text block) and determining whether the regularized sentiment score exceeds a threshold. As discussed further herein, if the score does not exceed the threshold, then the text block may be resized in particular embodiments and another iteration is performed on the resized text block. In particular embodiments, once the threshold is exceeded, a regularized sentiment profile for the conversation (conversation data object) is updated based on the score.

The term "sentiment scoring graph" may refer to a data object that describes a graphical representation of the sentiment progression with respect to a party of a conversation throughout the conversation (e.g., the conversation data object). For instance, in particular embodiments, the graphical representation may depict a per-time-unit sentiment score for each time unit of a plurality of sequential time units associated with the conversation data object, as well as a per-time-unit stage designation and/or per-sentiment-score text designation for each sentiment score.

Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Exemplary System Architecture

FIG. 1 provides an exemplary overview of an architecture 100 that can be used to practice embodiments of the present invention. The architecture 100 includes a conversation monitoring system 101 in communication with one or more external computing entities 102. Here, in particular embodiments, the conversation monitoring system 101 is configured to monitor the sentiment progression of a conversation as detailed further herein. Depending on the circumstances, the conversation monitoring system 101 may monitor a conversation in real time while the conversation is taking place or at a later time once the conversation has completed. For example, the conversation monitoring system 101 may exist in particular instances within a contact center environment and used to monitor calls, text message exchanges, and/or chats being conducted between agents (human and/or automated) and remote parties in real time so that actions may be taken in response to the monitoring. While in other instances, the monitoring may be conducted on conversations after they have concluded so that information can be gathered from them to use for different purposes such as, for example, monitoring the quality of the conversations and/or training those who took part in the conversations.

In various embodiments, the one or more external computing entities 102 may provide different services to aid the conversation monitoring system 101 in monitoring conversations. For instance, in particular embodiments, one or more of the external computing entities 102 may provide a speech-to-text service that transcribes the audio of a conversation into a text transcript. Here, the speech-to-text service may be provided as software as a service (SaaS) in which the one or more of the external computing entities 102 are third-party providers who host the speech-to-text service as a software application that is made available to the conversation monitoring system 101 over a network such as the Internet.

Likewise, one or more of the external computing entities 102 may provide other services such as sentiment analysis on various portions (e.g., text blocks) of a conversation. Again, the one or more of the external computing entities 102 may be third-party providers who host the sentiment analysis as SaaS that is made available to the conversation monitoring system 101 over a network such as the Internet. As explained in further detail herein, the sentiment analysis service offered by a particular external computing entity 102 may entail a sentiment analysis engine that performs a predictive analysis on a text block for a conversation to provide a pre-model sentiment score representing the sentiment of the text block with certain probability. For example, Google sentiment analysis offers a cloud-base natural language application program interface (API) that is commercially available and performs sentiment analysis on text to determine the overall attitude (positive or negative) represented by a numerical score and magnitude values.

In various embodiments, the conversation monitoring system 101 can include a conversation monitoring computing entity 106. The conversation monitoring computing entity 106 and the external computing entities 102 can be configured to communicate over a communication network (not shown). The communication network can include any wired or wireless communication network including, for example, the Internet, cellular network, a wired or wireless local area network (LAN), personal area network (PAN), metropolitan area network (MAN), wide area network (WAN), or the like, as well as any hardware, software and/or firmware required to implement it (such as, e.g., network routers, and/or the like).

Accordingly, in various embodiments, the conversation monitoring computing entity 106 is configured to perform the sentiment monitoring on the conversation. Here, the conversation monitoring computing entity 106 may host a sentiment monitoring engine (module) configured to provide a quantifiable measure (regularized sentiment score) for various text blocks of the conversation (e.g., conversation data object) determined from a consensus sentiment with probabilities used in conjunction with subjectivity and, optionally, a perceived stage of the conversation for the block. As previously explained, text blocks are produced from a data object of a conversation (e.g., a text transcript of the conversation) in which each of the text blocks is composed of a portion of the conversation spoken by a particular party during the conversation.

In this regard, the conversation monitoring computing entity 106 may host a sentiment aggregation engine (module) configured in various embodiments to gather sentiment evaluations for a current text block for the conversation from several independent sentiment analysis engines and use the evaluations as input to an aggregation model to generate an initial sentiment score for the text block. In addition, the conversation monitoring computing entity 106 may host one or more subjectivity engines (modules) configured to identify the subjectivity of the current text block as a subjectivity probability value and a stage-wise penalty factor engine (module) configured to determine a penalty factor for the current text block based on what stage of the conversation the current text block is found.

In various embodiments, the sentiment monitoring engine then determines a regularized sentiment score (ReSent score) for the current text block based on the initial sentiment score, subjectivity probability value, and, optionally, stage-wise penalty factor for the text block. As further explained herein, the current text block is resized in particular embodiments if the ReSent score is not over a threshold and a new ReSent score is then determined for the newly-sized text block. Once the entire data object for the conversation have been processed, the ReSent scores determined for the various blocks can then be combined to provide a regularized sentiment profile that represents the sentiment progression for the conversation. Further details of the sentiment monitoring engine, the sentiment aggregation engine, the one or more subjectivity engines, and the stage-wise penalty factor engine are provided herein with reference to FIGS. 3-9.

Finally, in various embodiments, the conversation monitoring system 101 may include a storage subsystem 108 in which information (e.g., data) such as the ReSent scores determined for the various text blocks of a conversation (e.g., the regularized sentiment profile) may be stored along with accompanying information on the conversation. Depending on the embodiment, the storage subsystem 108 can include one or more storage units, such as multiple distributed storage units that are connected through a computer network. Each storage unit in the storage subsystem 108 can store at least one of one or more data assets and/or one or more data about the computed properties of one or more data assets. Moreover, each storage unit in the storage subsystem 108 can include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. Here, the storage subsystem 108 may be in communication with the conversation monitoring computing entity 106 over one or more networks.

Exemplary Computing Entity

FIG. 2 provides a schematic of a computing entity 200 according to various embodiments of the present invention. For instance, the computing entity 200 may be the conversation monitoring computing entity 106 found in the system architecture 100 previously described in FIG. 1. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes can include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As shown in FIG. 2, the computing entity 200 in various embodiments may include or be in communication with a processing element 205 (also referred to as processor, processing circuitry, and/or similar terms used herein interchangeably) that communicates with other elements within the computing entity 200 via a bus, for example. It is to be appreciated that the processing element 205 can include one or more processing elements. As will be understood, the processing element 205 can be embodied in a number of different ways. For example, the processing element 205 can be embodied as one or more complex programmable logic devices (CPLDs), microprocessors, multi-core processors, coprocessing entities, application-specific instruction-set processors (ASIPs), microcontrollers, and/or controllers. Further, the processing element 205 can be embodied as one or more other processing devices or circuitry. The term circuitry can refer to an entirely hardware embodiment or a combination of hardware and computer program products. Thus, the processing element 205 can be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 can be configured for a particular use or configured to execute instructions stored in volatile or non-volatile media or otherwise accessible to the processing element 205. As such, whether configured by hardware or computer program products, or by a combination thereof, the processing element 205 can be capable of performing steps or operations according to embodiments of the present invention when configured accordingly.

In particular embodiments, the computing entity 200 can further include or be in communication with non-volatile memory 210. The non-volatile memory 210 can be non-volatile media (also referred to as non-volatile storage, memory, memory storage, memory circuitry and/or similar terms used herein interchangeably). Furthermore, in embodiments, the non-volatile memory 210 can include one or more non-volatile storage or memory media, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media can store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably can refer to a collection of records or data that is stored in a computer-readable storage medium using one or more database models, such as a hierarchical database model, network model, relational model, entity-relationship model, object model, document model, semantic model, graph model, and/or the like.

In various embodiments, the computing entity 200 can further include or be in communication with volatile memory 215. The volatile memory 215 can be volatile media (also referred to as volatile storage, memory, memory storage, memory circuitry and/or similar terms used herein interchangeably). Furthermore, in embodiments, the volatile memory 215 can include one or more volatile storage or memory media, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media can be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like can be used to control certain aspects of the operation of the computing entity 200 with the assistance of the processing element 205 and operating system.

As indicated, in various embodiments, the computing entity 200 can also include a network interface 220. Here, the network interface 220 may be one or more communications interfaces for communicating with various computing entities, such as by communicating data, content, information, and/or similar terms used herein interchangeably that can be transmitted, received, operated on, processed, displayed, stored, and/or the like. Such communication can be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing entity 200 can be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1x (1xRTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. Furthermore, it is to be appreciated that the network interface 220 can include one or more network interfaces.

Although not shown, the computing entity 200 can include or be in communication with one or more input elements, such as a keyboard input, a mouse input, a touch screen/display input, motion input, movement input, audio input, pointing device input, joystick input, keypad input, and/or the like. The computing entity 200 can also include or be in communication with one or more output elements (not shown), such as audio output, video output, screen/display output, motion output, movement output, and/or the like.

Exemplary System Operations

The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein.

A. Sentiment Monitoring Module

Turning now to FIG. 3, additional details are provided regarding a process flow for sentiment monitoring of a conversation according to various embodiments. Here, FIG. 3 is a flow diagram showing a sentiment monitoring module for performing such functionality according to various embodiments of the invention. For example, the flow diagram shown in FIG. 3 may correspond to operations carried out by a processor element 210 in a computing entity 200, such as the conversation monitoring computing entity 106 described in FIG. 1, as it executes the sentiment monitoring module stored in the computing entity's volatile and/or nonvolatile memory.

Accordingly, the process flow 300 begins in various embodiments with the sentiment monitoring module identifying a conversation data object in Operation 301. For instance, a conversation may involve a call conducted between a caller and an agent of a contact center that has been transcribed into a text transcript serving as the conversation data object. Depending on the embodiment, the transcription can be carried out by a speech-to-text engine that is commonly known by those of ordinary skill in the art. In addition, the engine may be locally hosted or accessible as a service through a third-party provider.

Next, the sentiment monitoring module identifies a text block for the conversation data object in Operation 302. For instance, returning to the conversation entailing a call conducted between a caller and an agent in a contact center, the sentiment monitoring module may identify the initial conversation block as the first utterance spoken by the caller during the call.

Once selected, the sentiment monitoring module determines an initial sentiment score in Operation 303 that represents a consensus sentiment for the text block. Accordingly, the sentiment monitoring module performs this particular operation in various embodiments by invoking a sentiment aggregation module. In turn, the sentiment aggregation module derives the initial sentiment score in particular embodiments by using an aggregation model and individual pre-model sentiment scores produced by a plurality of sentiment analysis engines. These individual pre-model sentiment scores represent a sentiment of the text block with certain probability that the sentiment aggregation module provides as inputs to the aggregation model to generate the initial sentiment score. In some embodiments, Operation 303 may be performed in accordance with the process depicted in FIG. 4, as described below.

In addition to the initial sentiment score, the sentiment monitoring module determines a subjectivity probability value in Operation 304. In various embodiments, the sentiment monitoring module performs this particular operation by invoking one or more subjectivity determination engines. Here, the subjectivity probability value provides a subjective measure to express a party's (e.g., the caller's) quality of being found in the text block based on or influenced by personal feelings, tastes, or opinions. Accordingly, in particular embodiments, the subjectivity probability value is leveraged as a regularization factor and represents a confidence/probability score for subjectivity.

Continuing, the sentiment monitoring module determines a stage-wise penalty factor in particular embodiments in Operation 305. Conversation stages may refer to the different phases of a conversation and in general, a particular stage of a conversation involves a particular focus at that time in the conversation. Thus, the sentiment of a conversation typically varies during the course of the conversation and some stages tend to have more subjectivity than others. Therefore, an inference of sentiment can be made based on what stage of the conversation the text block corresponds to for the conversation. Thus, the stage-wise penalty factor may be used to compensate for high sentiment probability for a particular text block even when subjectivity is low for the block. Here, the sentiment monitoring module performs this particular operation in various embodiments by invoking a stage-wise penalty factor module. It is noted that this particular factor may be optional depending on the embodiment. Therefore, the sentiment monitoring module may not determine a stage-wise penalty factor in certain embodiments. In some embodiments, Operation 306 may be performed in accordance with subsection B of the present section.

At this point, the sentiment monitoring module determines the ReSent score in Operation 306. The ReSent score serves as a quantifiable measure of sentiment for the text block. Thus, depending on the embodiment, the sentiment monitoring module may determine the ReSent score based on the initial sentiment score, the subjectivity probability value, and, optionally, the stage-wise penalty factor. In some embodiments, Operation 306 may be performed in accordance with the process depicted in FIG. 5, as described below.

Accordingly, in particular embodiments, the ReSent score is given by the following equation:

$$\text{ReSent Score} = N(pm + \lambda C_{subj})$$

Where:
pm: initial sentiment score;
$\lambda$: stage-wise penalty factor;
$C_{subj}$: subjectivity probability value; and
N: normalization constant.

At this point, the sentiment monitoring module determines whether the ReSent score satisfies a regularized sentiment score threshold in Operation 307. Here, in various embodiments, the threshold represents a level at which the sentiment label for the text block is considered to be identified with an acceptable level of confidence (e.g., high degree of certainty), where the acceptable level of confidence may be a numerical measure that takes into account at least one of stage-aware factors and subjectivity-aware factors in determining when a sentiment determination is deemed reliable. Therefore, if the ReSent score exceeds the threshold, then the sentiment classification for the text block is considered acceptable. Thus, in particular embodiments, the ReSent score is recorded as part of the regularized sentiment profile for the conversation.

If the ReSent score does not exceed the threshold, then the sentiment monitoring module is configured in various embodiments to resize the text block to remove or add one or more text units to the text block in Operation 308. For instance, returning to the conversation entailing a call conducted between a caller and an agent in a contact center, the sentiment monitoring module may resize the text block by adding one or more subsequent utterances (subsequent text units) spoken by the caller during the call. Once resized, the process flow 300 is then repeated for the text block. Thus, the sentiment monitoring module is configured in various embodiments to perform iterations until a ReSent score for a resized text block exceeds the threshold.

Once the ReSent score is over the threshold, then the sentiment monitoring module determines whether any additional text units remain for the conversation data object in Operation 309. If so, then the sentiment monitoring module returns to Operation 302 and identifies the next text block for the conversation data object. The sentiment monitoring module then repeats the process flow 300 just discussed for the newly selected text block.

Once all of the text units have been processed for the conversation data object, the sentiment monitoring module is configured in particular embodiments to have one or more actions performed in Operation 310. For instance, the sentiment monitoring module may be configured to simply log (record) the resulting regularized sentiment profile for the conversation (conversation data object). While in other instances, the sentiment monitoring module may be configured to have actions carried out that may be beneficial where the conversation is still taking place and corrective measures can be implemented.

In addition, although not shown in FIG. 3, the sentiment monitoring module may be configured in particular embodiments to have one or more actions performed based on the sentiment detected for a particular text block. For instance, if the conversation involves a Web chat actively taking place between a party who has visited a website and a chatbot, then a corrective measure could be implemented while the chat is still taking place if a negative sentiment with a high degree of certainty is detected for a particular text box (or group of text boxes). For example, the sentiment monitoring module may send a message to have a human agent bridged onto the chat to converse with the party. Therefore, configuring the sentiment monitoring module to have actions performed based on detected sentiment during various intervals of a conversation can facilitate taking corrective actions that can lead to increased customer satisfaction. Once any required actions have been initiated, the process flow 300 ends.

B. Sentiment Aggregation Module

Turning now to FIG. 4, additional details are provided regarding a process flow for determining an initial sentiment score for a text block according to various embodiments. Here, FIG. 4 is a flow diagram showing a sentiment aggregation module for performing such functionality according to various embodiments of the invention. For example, the flow diagram shown in FIG. 4 may correspond to operations carried out by a processor element 210 in a computing entity 200, such as the conversation monitoring computing entity 106 described in FIG. 1, as it executes the sentiment aggregation module stored in the computing entity's volatile and/or nonvolatile memory.

As previously mentioned, the sentiment aggregation module may be invoked by another module to generate the initial sentiment score. For instance, in particular embodiments, the sentiment aggregation module may be invoked by the sentiment monitoring module as previously described to generate the initial sentiment score for a particular text block of a conversation (conversation data object). However, with that said, the sentiment aggregation module may not necessarily be invoked by another module and may execute as a stand-alone module in other embodiments.

The process flow 400 begins in various embodiments with the sentiment aggregation module obtaining pre-model sentiment scores from a plurality of sentiment analysis engines (i.e., Engines A to N) in Operations 401A-401N. As previously mentioned, the sentiment analysis engines may be any appropriate sentiment modeling engine, such as sentiment modeling engines that are commercially available as services such as Microsoft Azure cognitive services, Google sentiment analysis, or Amazon Comprehend. Once the per-model sentiment scores have been obtained, the sentiment aggregation module processes the pre-model sentiment scores using an aggregation model to generate the initial sentiment score in Operation 402.

Accordingly, the aggregation model may be configured as an ensemble in particular embodiments. In general, ensemble modeling is the process of running two or more related but different models and then synthesizing the results of each model into a single score to improve the accuracy of predictive analytics. Depending on the embodiment, the sentiment analysis engines may be combined using several different techniques to generate the ensemble. Examples of three ensemble techniques are described.

The first of the noted ensemble techniques is bagging. Bagging involves combining classifiers via majority voting so that the class that receives the most votes is selected as the class for the particular instance. Here, bagging would involve combining the sentiment analysis engines by giving each engine a vote in determining the sentiment for a particular text block.

A second ensemble technique is boosting. This technique involves training the combination of sentiment analysis models using a weighted training dataset in which each text block for the conversations in the training dataset has a weight. Here, when a text block is misclassified by one of the sentiment analysis engines, the block's weight is increased so that the next engine is more likely to classify it correctly. The output is the weighted majority of the sentiment analysis engines. Boosting, in general, decreases the bias error and builds strong predictive models. However, a drawback with boosting is it can sometimes overfit the training dataset.

A third ensemble technique is stacking. The basic idea behind stacking is using a pool of base classifiers (e.g., the sentiment analysis engines) and then using another classifier to combine their predictions, with the aim of reducing the generalization error. Stacking can lead to a decrease in either the bias or variance error depending on the combining learner used. Thus, in various embodiments, the sentiment analysis engines act as "level 0" models, whose output is used to train the aggregation model, and the aggregation model is a stacked Meta-Learner based on the sentiment analysis engines ("level 0" models).

Accordingly, the different sentiment analysis engines are pre-trained and the training dataset in training the aggregation model can be domain-specific and/or generic conversation data objects (e.g., transcripts) depending on the embodiment. Further, the aggregation model may use any one of a number of different machine learning algorithms such as least-squares regression, random forest, support vector machine, perception, neural network, and/or the like. Specifically, in particular embodiments, the generated probabilities from the sentiment analysis are used as inputs to the aggregation model and the generated sentiment labels are discarded. Accordingly, the aggregation model is fitted based on the probabilities and training is concluded when loss stabilizes. Once the aggregation model has been trained, it can then be used by the sentiment aggregation module in labeling text blocks for "unseen" conversations.

C. Stage-Wise Penalty Factor Module

Turning now to FIG. 5, additional details are provided regarding a process flow for determining a stage-wise penalty factor for a text block according to various embodiments. Here, FIG. 5 is a flow diagram showing a stage-wise penalty factor module for performing such functionality according to various embodiments of the invention. For example, the flow diagram shown in FIG. 5 may correspond to operations carried out by a processor element 210 in a computing entity 200, such as the conversation monitoring computing entity 106 described in FIG. 1, as it executes the stage-wise penalty factor module stored in the computing entity's volatile and/or nonvolatile memory.

As previously mentioned, the stage-wise penalty factor module may be invoked by another module to generate the stage-wise penalty factor. For instance, in particular embodiments, the stage-wise penalty factor module may be invoked by the sentiment monitoring module as previously described to generate the stage-wise penalty factor for a particular text block of a conversation (conversation data object). However, with that said, the stage-wise penalty factor module may not necessarily be invoked by another module and may execute as a stand-alone module in other embodiments.

The process flow 500 begins with the stage-wise penalty factor module determining a related conversation stage for the text block in Operation 501. As previously mentioned, conversation stages may refer to the different phases of a conversation and in general, a particular stage of a conversation involves a particular focus at that time in the conversation. As noted, the sentiment of a conversation typically varies during the course of the conversation and some stages tend to have more subjectivity than others. Therefore, an inference of sentiment can be made based on what stage of the conversation the text block corresponds to for the conversation.

Here, in particular embodiments, the stage-wise penalty factor module is configured to identify the stage associated with a particular text block of a conversation by using a bag of words approach to identify an intent of the speaker. A bag of words model is a way of extracting features from text. In general, a bag of words is a representation of text that describes the occurrence of words within a document. Therefore, a bag of words involves two things: (1) a vocabulary of words and (2) a measure of the presence of known words. The order and structure of the words is not considered and is discarded.

For instance, briefly turning to FIG. 6, contact center health insurance calls typically fall into the categories of claim inquiry or benefit inquiry and each of these categories has different stages over the progression of the call 600 that may include one or more of a greeting stage 601, issue description stage 602, record fetch stage 603, and resolution/transfer stage 604. In addition, each of these categories has distinct words that have higher weightage to identify which of the various stages 601, 602, 603, 604 the call (e.g., text block of a call) is currently in.

For example, for a claim inquiry, the words "claim," "submitted," and "paid" may have a higher presence during the issue description stage 602. While the words "denied," "terms," and "limit" may have a higher presence during the resolution/transfer stage 604. Likewise, during a benefit inquiry, the words "covered," "coverage," "cost," and "in-network" may have a higher presence during the issue description stage 602 and the word "eligible" may have a higher occurrence during the resolution/transfer stage 604. Therefore, if the text block is for a claim inquiry call and the stage-wise penalty factor module were to determine the words found in a particular text block include "covered" and "cost," then the module would identify 611 the stage for the text block as the issue description stage 602.

In particular embodiments, the stage-wise penalty factor module may be configured to carry over the stage from a past text block if the stage for the current block cannot be identified. For instance, the stage-wise penalty factor module may have identified the stage for the previous text block as the record fetch stage 603. However, the stage-wise penalty factor module may be unable to identify the stage for the current text block. Specifically, none of the words found in the current text block may be found in the bag of words for any of the stages. Therefore, in this instance, the stage-wise penalty factor module may simply assign the record fetch stage 603 to the current text block. While in other embodiments, the stage-wise penalty factor may simply not generate a stage-wise penalty factor for the current text block if the module is unable to identify a stage for the block and the ReSent score may be generated without using the stage-wise penalty factor as an input.

Therefore, returning to FIG. 5, the stage-wise penalty factor module determines the stage-wise penalty factor for the text block in Operation 502. In various embodiments, the stage-wise penalty factor module performs this particular operation by processing the text block, the subjectivity probability value, and the identified conversation stage using a stage-wise penalty determination model to generate the stage-wise penalty factor. Here, depending on the embodiment, the stage-wise penalty determination model may be some type of machine learning model such as a standard regression model. Those of ordinary skill in the art can envision other types of models that may be used in light of this disclosure.

D. Example of Conducting Sentiment Monitoring on Resizable Text Blocks

An example is now described with respect to performing sentiment monitoring on a phone conversation between an agent in a contact center and a caller using resizable text blocks according to various embodiments of the invention. It should be understood that this example is provided to assist the reader's understanding of the advantages of using such text blocks realized in various embodiments and should not be construed to limit the scope of the invention.

Turning now to FIG. 7, a transcript of an example conversation 700 between the agent and caller is shown in which the caller is expressing frustration over support's failure to address an issue the caller is having. Here, the transcript 700 may have been produced from the audio of a call conducted between the agent and caller. Therefore, a speech-to-text engine may have been used to create the transcript (e.g., conversation data object) 700 from the audio of the phone call that typically segments the conversation based on the start of an utterance until the first audio silence or an interruption by the other party speaking. For example, the transcript 700 may be broken down into the utterances for the caller: "I have had multiple conversations with your support" 701; "It has been a complete waste of time" 702; and "No one has been able to address my problem" 703.

If conventional sentiment monitoring were to be performed, the monitoring would be on the individual utterances in a static manner and in isolation from one another. Therefore, the results of the monitoring would likely label the first utterance 701 as having positive sentiment and the second and third text utterances 702, 703 as negative. However, the conventional sentiment monitoring may result in labeling the first utterance 701 incorrectly. This is because conversations often involve frequent interruptions by other speakers such as, for example, other speakers providing filler words such as "ok" or "yes" or loudly interrupting the first party speaking. Therefore, single utterances in isolation from one another often do not adequately represent a speaker's sentiment.

However, various embodiments of the invention make use of text blocks that may be resized as needed to better identify the sentiment for a particular segment of a conversation. Turning now to FIG. 8, the first utterance 701 may be selected as the initial text block 801 for analyzing in various embodiments, resulting in a ReSent score of 0 (shown as Subjectivity) and labeling the sentiment for the initial text block 801 as (pos, neu, neg):(0.866, 0.1322, 0). Thus, the sentiment is identified as positive. However, the ReSent score fails to meet the threshold of 0.3 and therefore, the initial text block 801 is not labeled. That is to say, the initial text block 801 is not mislabeled as is the case when conventional sentiment monitoring is performed on the first utterance 701.

Accordingly, the initial text block 801 is then resized to include the second utterance 702 along with the first utterance 701. The newly resized text block 802 is then analyzed, resulting in a ReSent score of 0.133 and labeling the sentiment for the block 802 as (pos, neu, neg):(0.423, 0.021, 0.556). Here, although the resized text block 802 is labeled as having negative sentiment, the ReSent score still fails to meet the threshold and therefore, the resized text block 802 is not labeled.

As a result, the resized text block 802 is further resized to include the third utterance 803 along with the first and second utterances 701, 702. This newly resized text block 803 is then analyzed, resulting in a ReSent score of 0.33 and labeling the sentiment for the block 803 (pos, neu, neg): (0.386, 0.018, 0.596). Now, the ReSent score for the resized text block 803 meets the threshold. Therefore, the overall sentiment for the resized block 803 is identified as negative by considering all three utterances 701, 702, 703.

Accordingly, by using a resizable text block in various embodiments helps to give a better insight into the actual conversation. The changing of the size of the text block generally depends on the initial sentiment score generated by the aggregation model, the subjectivity, and, optionally, the stage-wise penalty factor. In this example, the text block being analyzed is resized (e.g., increased) until the ReSent score is greater than or equal to 0.3. In various embodiments, the threshold may be set using a purely heuristic approach that is tunable over time.

E. Sentiment Scoring Graphs

FIG. 9 provides a representation of a sentiment progression with respect to a party of a conversation throughout the conversation presented in a graphical format. For instance, the representation shown in FIG. 9 may be displayed on a sentiment scoring graph viewable on an interface of a computing entity 200. Here, the graphical representation of the sentiment progression displays a regularized sentiment profile of the conversation as a line 910 on a graph 900. The regularized sentiment profile is composed of sentiment scores (e.g., ReSent scores) representing the sentiment expressed by the party at different times throughout the conversation. Each of the sentiment scores found in the profile represents a sentiment determination made for a resizable text block processed for the conversation data object of the conversation. That is to say, in various embodiments, each resizable text block with a ReSent score over the threshold for an iteration along with the ReSent score, itself, is recorded as a part of the regularized sentiment profile for the conversation. Thus, the various data points 921, 922, 923, 924, 925 of the line 910 displayed on the graph 900 represent the various ReSent scores recorded for the regularized sentiment profile of the conversation.

The sentiment score is shown on the y axis 902 and the time elapsed during the conversation is shown on the x axis 901. Therefore, the graphical representation shown in FIG. 9 depicts a per-time-unit sentiment score for each time unit of a plurality of sequential time units associated with the conversation (conversation data object).

It is noted that the ReSent score is displayed on the graph 900 to indicate the sentiment of the party at that time during the conversation. Specifically, a positive ReSent score indicates a positive sentiment and a negative ReSent score indicates a negative sentiment. The value of the score itself indicates the degree of certainty the party was expressing that sentiment at the time. Therefore, as a ReSent score approaches zero, the less certainty there is the party was actually expressing the associated sentiment at that time with a zero ReSent score indicating neutral sentiment. In addition, the graphical representation shown in FIG. 9 may depict a per-sentiment-score text designation for each sentiment score. For instance, in particular embodiments, the user viewing the graphical representation may select one of the sentiment score data points 921 and a pop-up 931 may be provided with the text designation used in determining the score. In addition, per-time unit stage designations 941, 942, 943, 944 may be shown on the graph 900 to show the sentiment progression of the conversation over the various stages. This particular information may also be recorded for the regularized sentiment profile for the conversation.

CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method for performing conversation sentiment monitoring for a conversation data object, the computer-implemented method comprising:

identifying a text block within the conversation data object;

performing one or more successive regularized sentiment profile generation iterations until a regularized sentiment score of the text block exceeds a regularized sentiment score threshold, wherein performing a current regularized sentiment profile generation iteration of the one or more successive regularized sentiment profile generation iterations comprises:

determining the regularized sentiment score for the text block based on an initial sentiment score for the text block and at least one of a subjectivity probability value for the text block and a stage-wise penalty factor for the text block;

determining whether the regularized sentiment score exceeds the regularized sentiment score threshold;

in response to determining that the regularized sentiment score exceeds the regularized sentiment score threshold, updating a regularized sentiment profile of the conversation data object based on the regularized sentiment score; and in response to determining that the regularized sentiment score fails to exceed the regularized sentiment score threshold;

resizing the text block, and performing a subsequent regularized sentiment profile generation iteration of the one or more regularized sentiment profile generation iterations based on the resized text block; and causing one or more actions to be performed based on the regularized sentiment profile.

2. The computer-implemented method of claim 1 further comprising generating the initial sentiment score using an aggregation model and a plurality of pre-model sentiment scores determined from a plurality of sentiment prediction models as input to the aggregation model.

3. The computer-implemented method of claim 1 further comprising:

identifying a related conversation stage that is associated with the text block; and determining the stage-wise penalty factor using a segment-wise penalty determination model and at least one of the text block, the subjectivity probability value, or the related conversation stage.

4. The computer-implemented method of claim 1, wherein the conversation data object comprises one or more sequential text units, the text block is associated with a current subset of the one or more sequential text units, and resizing the text block comprises adding one or more text units of the one or more sequential text units to the current subset.

5. The computer-implemented method of claim 1, wherein the conversation data object represents at least one of a call or a Web chat actively taking place, and the one or more actions comprise causing a party to be bridged onto the at least one of the call or the Web chat.

6. The computer-implemented method of claim 1, wherein the one or more actions comprise causing a sentiment scoring graph to be displayed on a computer interface showing a per-time-unit sentiment score for each time unit of a plurality of time units associated with the conversation data object.

7. The computer-implemented method of claim 6, wherein the sentiment scoring graph further displays at least one of a per-time-unit stage designation for each time unit of the plurality of time units or a per-sentiment-score text designation for each per-time-unit sentiment score.

8. An apparatus for performing conversation sentiment monitoring for a conversation data object, the apparatus comprising at least one processor and at least one memory including a computer program code, the at least one memory and the computer program code configured to, with the at least one processor, cause the apparatus to:

identify a text block within the conversation data object;

perform one or more successive regularized sentiment profile generation iterations until a regularized sentiment score of the text block exceeds a regularized sentiment score threshold, wherein the apparatus performs a current regularized sentiment profile generation iteration of the one or more successive regularized sentiment profile generation iterations by:

determining the regularized sentiment score for the text block based on an initial sentiment score for the text block and at least one of a subjectivity probability value for the text block and a stage-wise penalty factor for the text block;

determining whether the regularized sentiment score exceeds the regularized sentiment score threshold;

in response to determining that the regularized sentiment score exceeds the regularized sentiment score threshold, updating a regularized sentiment profile for the conversation data object based on the regularized sentiment score; and in response to determining that the regularized sentiment score fails to exceed the regularized sentiment score threshold;

resizing the text block, and performing a subsequent regularized sentiment profile generation iteration of the one or more regularized sentiment profile generation iterations based on the resized text block; and causing one or more actions to be performed based on the regularized sentiment profile.

9. The apparatus of claim 8, wherein the at least one memory and the computer program code are configured to, with the at least one processor, cause the apparatus to generate the initial sentiment score using an aggregation model and a plurality of pre-model sentiment scores determined from a plurality of sentiment prediction models as input to the aggregation model.

10. The apparatus of claim 8, wherein the at least one memory and the computer program code are configured to, with the at least one processor, cause the apparatus to:

identify a related conversation stage that is associated with the text block; and determine the stage-wise penalty factor using a segment-wise penalty determination model and at least one of the text block, the subjectivity probability value, or the related conversation stage.

11. The apparatus of claim 8, wherein the conversation data object comprises one or more sequential text units, the text block is associated with a current subset of the one or more sequential text units, and resizing the text block comprises adding one or more text units of the one or more sequential text units to the current subset.

12. The apparatus of claim 8, wherein the conversation data object represents at least one of a call or a Web chat actively taking place, and the one or more actions performed comprise causing a party to be bridged onto the at least one of the call or the Web chat.

13. The apparatus of claim 8, wherein the one or more actions performed comprise causing a sentiment scoring graph to be displayed on a computer interface, where the sentiment scoring graph shows a per-time-unit sentiment score for each time unit of a plurality of time units associated with the conversation data object.

14. The apparatus of claim 13, wherein the sentiment scoring graph further displays at least one of a per-time-unit stage designation for each time unit of the plurality of time units or a per-sentiment-score text designation for each per-time-unit sentiment score.

15. A non-transitory computer storage medium comprising instructions for performing conversation sentiment monitoring for a conversation data object, the instructions being configured to cause one or more processors to at least perform operations configured to:

identify a text block within the conversation data object;

perform one or more successive regularized sentiment profile generation iterations until a regularized sentiment score of the text block exceeds a regularized sentiment score threshold, wherein performing a current regularized sentiment profile generation iteration of the one or more successive regularized sentiment profile generation iterations involves:
  determining the regularized sentiment score for the text block based on an initial sentiment score for the text block and at least one of a subjectivity probability value for the text block and a stage-wise penalty factor for the text block;
  determining whether the regularized sentiment score exceeds the regularized sentiment score threshold;
  in response to determining that the regularized sentiment score exceeds the regularized sentiment score threshold, updating a regularized sentiment profile for the conversation data object based on the regularized sentiment score; and
  in response to determining that the regularized sentiment score fails to exceed the regularized sentiment score threshold;
    resizing the text block, and
    performing a subsequent regularized sentiment profile generation iteration of the one or more regularized sentiment profile generation iterations based on the resized text block; and
causing one or more actions to be performed based on the regularized sentiment profile.

16. The non-transitory computer storage medium of claim 15, wherein the operations are further configured to generate the initial sentiment score using an aggregation model and a plurality of pre-model sentiment scores determined from a plurality of sentiment prediction models as input to the aggregation model.

17. The non-transitory computer storage medium of claim 16, wherein the operations are further configured to:
  identify a related conversation stage that is associated with the text block; and
  determine the stage-wise penalty factor using a segment-wise penalty determination model and at least one of the text block, the subjectivity probability value, or the related conversation stage.

18. The non-transitory computer storage medium of claim 16, wherein the conversation data object comprises one or more sequential text units, the text block is associated with a current subset of the one or more sequential text units, and resizing the text block comprises adding one or more text units of the one or more sequential text units to the current subset.

19. The non-transitory computer storage medium of claim 16, wherein the conversation data object represents at least one of a call or a Web chat actively taking place, and the one or more actions performed comprise causing a party to be bridged onto the at least one of the call or the Web chat.

20. The non-transitory computer storage medium of claim 16, wherein the one or more actions performed comprise causing a sentiment scoring graph to be displayed on a computer interface, where the sentiment scoring graph shows a per-time-unit sentiment score for each time unit of a plurality of time units associated with the conversation data object.

* * * * *